T. VON ZWEIGBERGK.
GEAR CHANGING DEVICE.
APPLICATION FILED JULY 1, 1918.
1,357,484.
Patented Nov. 2, 1920.
3 SHEETS—SHEET 1.
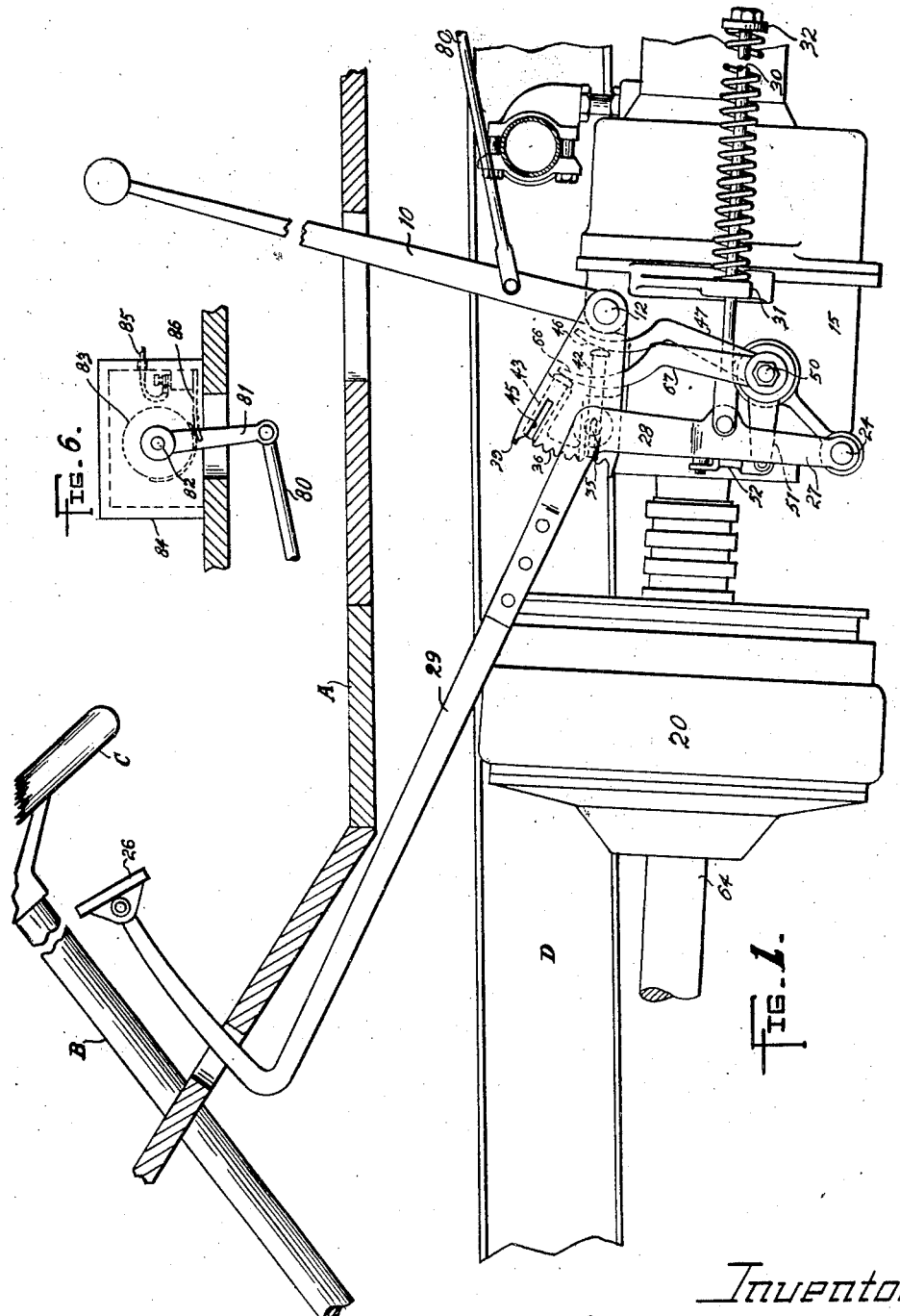
Inventor:
Thorsten von Zweigbergk
By Bates & Macklin
Attys.

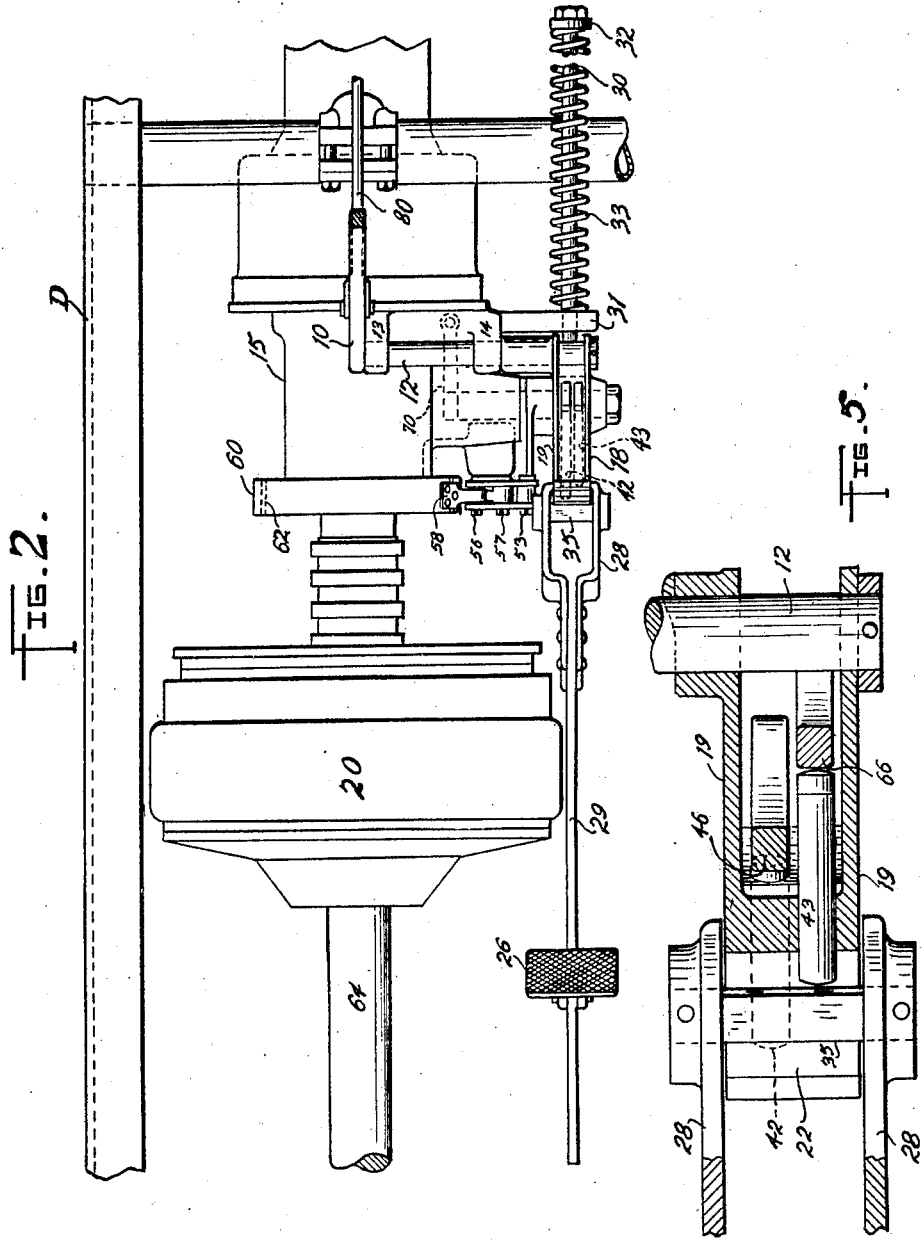

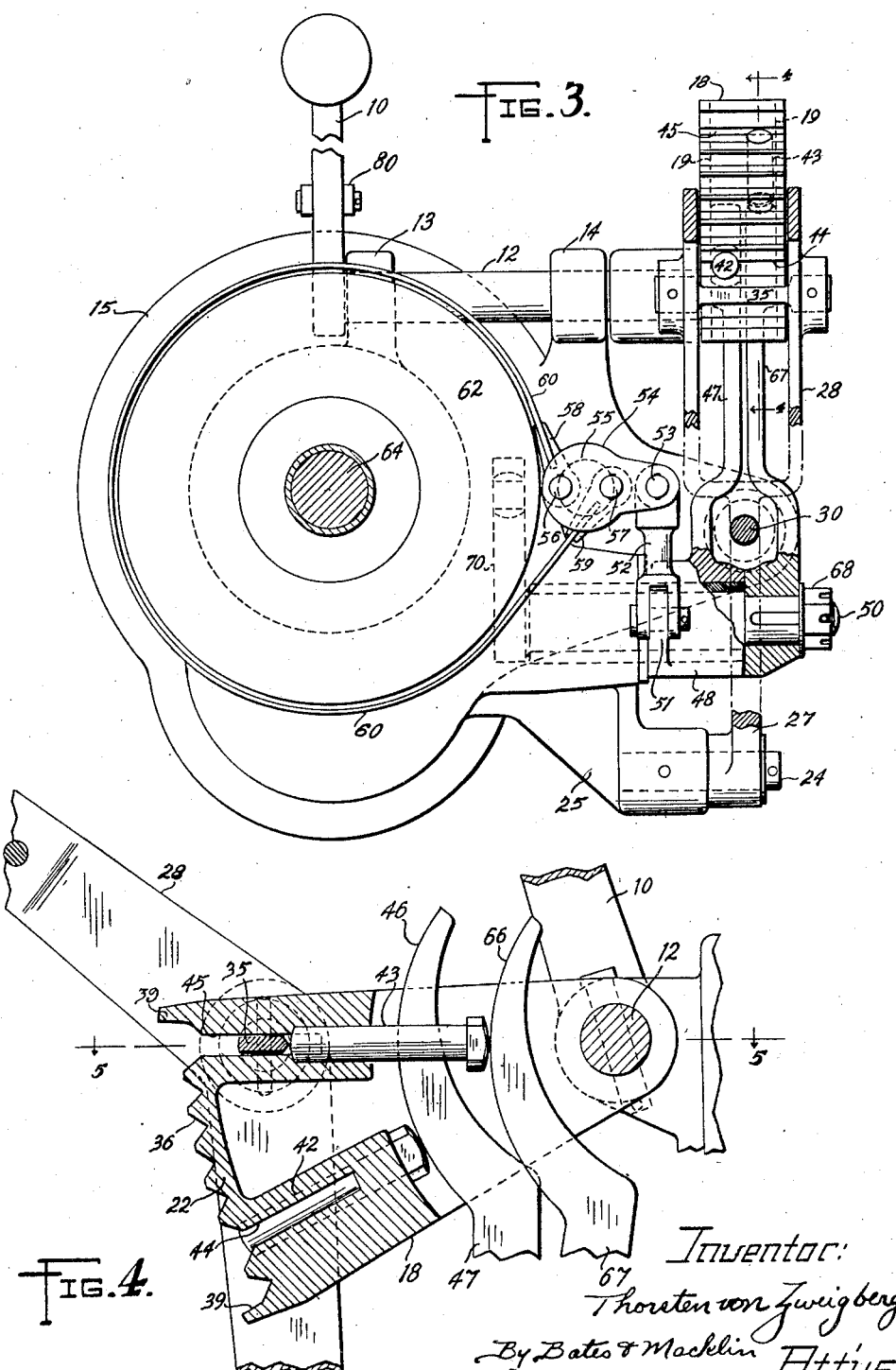

UNITED STATES PATENT OFFICE.

THORSTEN von ZWEIGBERGK, OF LANCASTER, ENGLAND.

GEAR-CHANGING DEVICE.

1,357,484.      Specification of Letters Patent.      Patented Nov. 2, 1920.

Application filed July 1, 1918. Serial No. 242,779.

*To all whom it may concern:*

Be it known that I, THORSTEN VON ZWEIGBERGK, a citizen of the United States, residing at Lancaster, in the county of Lancaster, England, have invented a certain new and useful Improvement in Gear-Changing Devices, of which the following is a full, clear, and exact description, reference being had to the accompanying drawings.

This invention relates to gear changing devices for use with transmission gearing in which a dynamo electric machine is employed in combination with mechanical gearing in such manner that some of the speed ratios are obtained by mechanical actions.

An object of the present invention is to provide a simple effective means for coöperating with such a dynamo electric machine and transmission device to change the speed ratios, for example, by locking one of the elements of an epicyclic gear to obtain one speed ratio, by actuating a clutch to cause the epicyclic gear train to rotate as a unit for another speed ratio, and to obtain still other ratios by varying electric circuits connected with the dynamo electric machine.

The present invention is not limited to use with any particular type of electric machine or gearing. It is well adapted for employment with a gear changing system, wherein the driving motor and a dynamo electric machine are connected with the propeller shaft by means of epicyclic gearing, such for instance, as that shown in Patent No. 1,307,230, issued June 17, 1919, to me on application of myself and Gillis von Zweigbergk, for change speed gearing.

In the embodiment shown, two mechanical changing devices are employed and a member controlling the actuation of these two devices is connected with a means for electrically modifying the speed ratio, whereby a movable controlling member may determine successive changes of the electrical connections by a series of progressive steps, and at predetermined positions may cause the actuation of the mechanical ratio changing devices. Among the objects of the present invention, therefore, is the provision of such a controlling member and means for retaining or locking such member in various positions, each one of which may effect either an electrical or mechanical change, or both, in the speed ratio.

The invention is herein illustrated as applied to a motor car equipped with a dynamo electric machine and transmission gearing. Other objects will become apparent in the following description which refers to the accompanying drawings, and the essential characteristics are summarized in the claims.

In the drawings, Figure 1 is a sectional elevation of a portion of a motor car and dynamo electric transmission gearing provided with the speed ratio changing devices arranged to illustrate a convenient embodiment of this invention; Fig. 2 is a sectional plan of the parts shown in Fig. 1; Fig. 3 is an enlarged transverse sectional elevation of the mechanical gear changing operating members; Fig. 4 is a still further enlarged sectional detail through the controlling and locking member; Fig. 5 is a section on the line 5—5 of Fig. 4; and Fig. 6 is an elevation of a controller mounted on a portion of the motor car body at the right of the parts shown in Fig. 1.

Describing the parts by the use of reference characters, A indicates a floor portion of a motor car frame, B the usual steering column and C the steering wheel. D indicates one of the side frame members of the chassis.

Extending upwardly through the floor A and into a position within reach of the operator or driver is a hand operated lever 10 mounted on a rock shaft 12, journaled in bearings 13 and 14 rising from a casing 15, inclosing the transmission gearing connecting the dynamo electric machine, illustrated at 20, with the propeller shaft of the motor. On the opposite end of the rock shaft 12 is a locking plate rigid with the shaft and adapted to be oscillated by the movement of the lever 10. This plate, as illustrated at 18, is substantially sector-shaped and made hollow adjacent to the shaft 12 and has two separated walls 19 extending from an integral substantially arcuate wall 22 at the outer portion of the sector.

Pivoted on a bearing pin 24 secured in a bracket 25 extending laterally and downwardly from the casing 15 is a lever carrying a pedal 26. The lever is shown as comprising a single arm member 27 rising from the pivot pin and secured to two parallel straps 28 extending outwardly and secured to the upper arm 29 of this lever which is shown as extending along beneath the floor A and through an opening therein in an arcuate path substantially concentric of the pivot. Secured to the portion 27 is a rod 30 extending rearwardly through a guide 31 shown as rigid with the casing 15. The rod has on its rear end a suitable washer and nut indicated at 32 while a compression spring 33 has its ends abutting the guide 31 and the washer and acts to draw the rod 30 rearwardly, drawing the pedal lever rearwardly and upwardly.

The separated members 28 are positioned to pass at opposite sides of the locking plate 18 while a transverse pin 35 is carried by these straps and has its forward edge sharpened to fit notches 36 in the arcuate portion 22 of the plate 18.

Pivotally connected to the lever 10 is a link 80 extending rearwardly to a rock arm 81, (Fig. 6) secured on a shaft 82, shown as carrying a controller drum 83 within a suitable controller box 84 and indicated in broken lines. Electrical conductors indicated at 85 may lead to contacts 86 engaging the controller drum to vary the electrical connections consequent upon the oscillation of the drum, in any approved manner. It will be seen that by oscillating the lever 10, the controller is moved to vary the circuits which are suitably connected with the dynamo electric machine to vary the speed ratios. Each position of the controller may be maintained by the engagement of the latch pin 35 with the notches 36 in the plate 18, which by the action of the spring 33 locks this plate holding the shaft 12, lever 10, link 80 and controller members in any position given them. Movement of these parts to shift the connecting pin 35 from one notch to the next is permitted by releasing the latch pin by moving the pedal lever. Stops 39 formed at the ends of the arcuate portion of the plate may engage the sides of the bar 35 to limit the oscillating movement of the plate 18.

Slidably mounted in the plate 18 are pusher pins 42 and 43 positioned radially with relation to the shaft 12 and at 44 and 45 are slots extending entirely through the plate transversely thereof and inwardly toward the shaft for a considerable distance.

It will be seen that to present one of these slots 44 or 45 to the latch bar 35 will permit this bar to enter the slot (being guided by notches similar to the notches 36) and force the corresponding pusher pin inwardly toward the shaft 12 under the influence of the spring 33. I utilize this movement to effect mechanical gear changes as follows.

Referring first to the action of the pin 42; upon presenting the slot 44 to the bar 35 by movement of the lever 10, this pin is moved inwardly by the spring 33 and caused to engage an arcuate surface 46 on the upper end of a lever 47 integral with a hub portion 48 rotatably embracing a sleeve mounted on a stub shaft 50. Shown as extending forwardly from the hub 48 is a lever arm 51 integral therewith and pivotally connected with a short link 52, in turn connected at 53 with ears on disks 54, one of which is integral with a rotatable stud 55, and has separated pins 56 and 57 extending forwardly through the corresponding disk. Between these disks are eyelets 58 and 59, embracing the pins 56 and 57 respectively, and secured to the ends of a brake band 60, which embraces a brake disk 62 on a transmission shaft 64 to accomplish a mechanical change of speed ratio in the transmission gearing.

Similar actuation of the pin 43 may cause the latch bar 35 to move this pin inwardly into an engagement with an arcuate surface 66 on the upper end of a lever arm 67 keyed to the oscillating shaft 50 and secured by a suitable nut indicated at 68. This shaft is shown as extending inwardly to a point within the casing 15 where it may be connected to a rock arm 70 for controlling a clutch, not shown, adapted to lock the gearing to cause it to rotate as a unit.

A brief description of the complete operation of my invention may be given as follows.

Assuming that the lever 10 and the plate 18 are so positioned that the bar 35 is in engagement with the lowest notch 36; this position may be that in which no power is being transmitted. Now the pedal lever may be moved forwardly slightly, by application of the foot to the pedal to allow the plate to be moved to present the notch of the slot 44 and the end of the pin 42 to the bar 35, whereupon the action of the spring 33 may withdraw the pedal lever forcing the pusher pin 42 inwardly and actuating the lever 47, which through the connections described may actuate the brake band and lock the disk 62 against rotation. The movement of the plate 18 at the same time causes a corresponding change in the electrical connections by movement of the controller drum through the link 80 and rock arm 81. While the parts are in this position, the gearing is operating in a manner so as to deliver a predetermined low speed. To increase the speed, the pedal lever may be actuated to draw the bar 35 from the notch 44 whereupon the plate 18 may be moved to change the controller, and at the same time present the next notch to the bar 35 where it may be allowed to remain for any desired length of time. Successive changes of the electrical connections may be accomplished by shifting the lever 10 to present the successive notches 36 to the coacting bar 35, thus retaining the controller in any of such positions. To attain the full speed, the slot 45 is presented to the bar 35 by further movement of the lever 10 whereupon the spring 33 may again act to withdraw the pedal lever to force the pin 43 inwardly and actuate the lever 67, rock shaft 50 and rock arm 70 to operate a clutch which may lock the gearing, causing it to rotate as a unit, whereupon the dynamo electric machine may drive through the mechanical gearing to the propeller shaft as though directly connected thereto by a single shaft. To reduce the speed, these operations may be merely reversed.

The present invention has been described as embodied in a motor car equipped with a dynamo electric machine. It is to be understood, however, that the particular mechanical connection to the gear changing device and the character of the transmission gearing may be varied as expediency requires without departing from the spirit of this invention.

From the foregoing description, it will be seen that I have provided a member to effect changes in the electrical circuits combined with a locking plate and lock therefor and control members for effecting mechanical changes in the gear so carried in relation to the locking plate and its lock as to be automatically operated by the lock when the latter engages the appropriate notch or its equivalent.

Having thus described my invention, what I claim is:

1. The combination, with electrical energy converting means and mechanical gearing connected therewith, of a controller movable to vary electrical connections to said means, means operatively connected with the controller and with the mechanical gearing to effect a mechanical change in the gearing, said means including a movable member adapted to be locked in various positions corresponding to changes in the controller and to cause actuation of the gear changing means in one of the positions of said member.

2. The combination, with electrical energy converting means and mechanical gearing connected therewith, of a controller movable through successive positions to vary electrical connections to said means, means for operating the controller, and connections operated by said means for effecting mechanical changes in the gearing, said connections including a movable member, means for locking said member in various positions corresponding to positions of the controller, and means for causing an actuation of the gear changing connections consequent upon the movement of said member to a certain position.

3. The combination, with an electro-magnetic machine and mechanical transmission gearing connected therewith, of a controller movable to vary electrical connections through said machine, a manually operable member for moving said controller, a movable member actuated thereby and adapted to be locked in various positions, and means for effecting mechanical changes in the gearing including an actuating member held out of active position by said movable member and adapted to engage and operate the gear changing means when said movable member is in certain positions.

4. The combination, with transmission gearing of the character described, of a controller movable to vary electrical connections, a member movable with the controller, movable elements connected with the gearing to effect mechanical changes therein, means for engaging and actuating said elements, said movable member being positioned to hold the actuating means out of engagement with said elements and adapted to be moved to permit such engagement.

5. The combination, with transmission gearing embodying a dynamo electric machine and mechanical gearing, of a controller actuating device, a movable member carried thereby, an actuating element connected with the gearing, a tension device for moving said element to effect a mechanical change in the gearing, said movable member holding the tension device normally out of engagement with said elements and movable to a position to permit operative engagement.

6. In a gear changing device of the character described, the combination of an electrical controller, a dynamo electric means governed thereby, mechanical gearing connected with said means, means for actuating the controller, a movable member actuated by the controller moving means, a manually controllable locking device engaging said member to hold it in various positions, an actuating element for effecting mechanical changes in the gearing, means for applying constant tension to said element, said movable member serving to hold said actuating device out of engagement with said element and movable to permit the actuating device to engage said element.

7. The combination with transmission gearing of the character described, of a controller, movable to vary electrical connections, an oscillating member movable with the controller, means for effecting mechanical changes in the gearing including a displaceable element, a locking member engaging the oscillating member for holding it against movement and adapted in a certain position of the oscillating member to engage and actuate said displaceable element.

8. The combination with transmission gearing of the character described, of means for effecting changes in the speed ratio, including an oscillating member, a member for locking said oscillating member in various positions, a displaceable element for effecting a mechanical change in the gearing and adapted to be engaged and moved by said locking member, said oscillating member having cutaway portions to permit such engaging movement.

9. In a transmission gearing of the character described, the combination of means for changing the speed ratio of such gearing including an oscillating member and a coacting locking member, one of said members having a projection and the other coacting depressions, a displaceable element for effecting a mechanical change in the gearing, means for moving the locking member into engagement with said displaceable element to actuate the latter, one of said members having an enlarged depression to permit such movement.

10. In a transmission gearing of the character described, the combination with a dynamo electric machine, of a controller for electric circuits affecting said machine, mechanical gearing connected with said machine, a controller for effecting electrical changes, a device for changing the mechanical gearing including a manually operable lever connected with a controller, an oscillating plate moved therewith, means for engaging and locking said plate in various positions, a manually movable lever for actuating the locking means, constant tension means for moving the latter lever into engagement with the plate, said plate having a slot to receive the locking means, a displaceable member moved by said locking means when in the slot, and connections between the displaceable member and the mechanical gear changing means.

In testimony whereof, I hereunto affix my signature.

THORSTEN von ZWEIGBERGK.